Patented Nov. 23, 1948

2,454,308

UNITED STATES PATENT OFFICE 2,454,308

PRODUCTION OF ACRYLONITRILE

Harold S. Davis, Riverside, Conn., and Herbert A. Newey, Richmond, Calif., assignors to American Cyanamid Company, New York, N. Y., a corporation of Maine No Drawing. Original application April 30, 1946, Serial No. 666,197. Divided and this application April 1, 1948, Serial No. 18,494. In Canada August 1, 1946

8 Claims. (Cl. 260—465.3)

The present invention relates to the production of acrylonitrile, and more particularly to an improved method for the catalytic production of acrylonitrile from hydrocyanic acid and acetylene.

It is known that acrylonitrile may be obtained by passing a mixture of hydrocyanic acid and acetylene over such materials as activated carbon, silica gel and metal cyanides heated at temperatures ranging from 400 to 500° C. Although these substances definitely catalyze the reaction, considerable side reactions occur and the rate of production of acrylonitrile is relatively slow. Consequently, the yield and quality of the nitrile produced under these conditions are not conducive in commercial operation.

The principal object of this invention is to devise a method wherein acrylonitrile may be readily and cheaply obtained. Another object resides in a method for the production of acrylonitrile requiring only simple equipment with high efficiencies. A further object is the provision of an improved method for catalytically producing acrylonitrile from hydrocyanic acid and acetylene. Other objects will appear hereinafter.

It has been found that the above objects may be accomplished by bringing acetylene together with hydrocyanic acid into contact with an aqueous acid reacting solution of a cuprous salt and preferably a halide such as the chloride, and zinc chloride, said solution also containing a salt of the class consisting the ammonium, amine and alkali metal salts.

The aqueous acid reacting solution serving as the catalyst for the reaction of acetylene with hydrocyanic acid is maintained at a temperature within the range of from about 60 to 110° C., and preferably within the range of 80 to 95° C.

As a catalyst for the reaction, this invention utilizes an aqueous acid solution of cuprous salt (e. g. cuprous chloride, bromide, iodide, cyanide, formate, acetate, etc.) and zinc chloride. A soluble salt of ammonium, an amine or an alkali metal is added for the purpose of holding the otherwise relatively insoluble cuprous salt in solution, probably by combining with it to form a soluble complex salt. It is advantageous to add to the catalyst metallic copper such as strips or powder in order to maintain the copper salt in the monovalent state as cupric copper may cause undesired side reactions.

The advantage of the acidic nature of the catalyst is that it prevents the formation of potentially explosive acetylides. The acid reaction of the catalyst is attained by adding a halogen acid (e. g. HCl, HBr, etc.) until the solution reaches a clear yellow state and is acid to Congo red paper and shows a pH of 1 to 4 on standard alkacid paper.

A typical example of the catalyst composition (parts being by weight) is as follows:

164 parts of cuprous chloride, 103 parts of ammonium chloride, 2 parts of concentrated hydrochloric acid (37%) and 175 parts of water to which there is added from 0.05 to 0.2 of a mol of zinc chloride per mol of cuprous halide.

A preferred method of operation is disclosed in U. S. Patent No. 2,385,469 wherein the partial pressure of the acetylene exceeds that of the hydrocyanic acid over the catalyst solution.

The data given in the table below illustrate the increase in the catalyst capacity obtained by adding the chloride of zinc, operating under the following conditions:

Initial catalyst composition, 164 g. CuCl, 103 g. NH₄Cl, 175 g. H₂O, 2 g. conc. HCl.
Temperature of catalyst solution, 86° C.
Stirring rate of catalyst solution, 5000–7000 R. P. M.
Acetylene flow rate, 35 liters per hour (measured at 25° C. and 760 mm.).
Partial pressure of HCN in incoming gas, 100 mm.
Duration of runs, 4 hours.

| Chloride added. Mol per Mol. of CuCl | Four hour period | Per cent yield of acrylonitrile based on the HCN added | Grams of acrylonitrile per 100 g. of CuCl per hour | Per cent by weight of HCN in product |
|---|---|---|---|---|
| None | 1st | 72.9 | 4.24 | 2.10 |
| Do | 2nd | 77.0 | 4.50 | 8.20 |
| Do | 3rd | 65.4 | 3.80 | 17.40 |
| Do | 4th | 58.6 | 3.42 | 21.60 |
| 0.1 ZnCl₂ | 1st | 75.3 | 4.39 | 0.54 |
| Do | 2nd | 92.6 | 5.42 | 0.54 |
| Do | 3rd | 96.0 | 5.61 | 0.56 |
| Do | 4th | 95.8 | 5.59 | 0.55 |

Other metallic chlorides such as, for example, the chlorides of cobalt, nickel, manganese, calcium, barium, strontium, lithium, magnesium, aluminum, tin, mercury, silver, lead, cadmium and antimony, when added to the cuprous chloride catalyst solution either had substantially no effect or decreased the capacity of the catalyst for the production of acrylonitrile from acetylene and hydrocyanic acid.

The present application is a division of our copending application Serial No. 666,197, filed April 30, 1946.

While the invention has been described with particular reference to specific embodiments, it is to be understood that it is not to be limited

We claim:

1. A method of producing acrylonitrile which comprises bringing acetylene together with hydrocyanic acid into contact with an aqueous acid reacting solution of a cuprous salt and zinc chloride, said solution also containing a salt of the class consisting of ammonium, amine, and alkali metal salts.

2. A method of producing acrylonitrile which comprises bringing acetylene together with hydrocyanic acid into contact with an aqueous acid reacting solution of a cuprous halide and zinc chloride, said solution also containing a salt of the class consisting of ammonium, amine, and alkali metal salts.

3. A method of producing acrylonitrile which comprises bringing acetylene together with hydrocyanic acid into contact with an aqueous acid reacting solution of cuprous chloride and zinc chloride, said solution also containing a salt of the class consisting of ammonium, amine, and alkali metal salts.

4. A method of producing acrylonitrile which comprises reacting acetylene and hydrocyanic acid in an acidic aqueous solution comprising cuprous chloride and zinc chloride, said solution containing ammonium chloride as a solubilizer for the cuprous chloride.

5. A method of producing acrylonitrile which includes the steps of continuously reacting together acetylene and hydrocyanic acid in a heated aqueous acid reacting solution of a cuprous salt and zinc chloride as a catalyst in the presence of a solubilizer for the catalyst while maintaining the partial pressure of the acetylene greater than that of the hydrocyanic acid over the catalyst solution.

6. A method of producing acrylonitrile which includes the steps of continuously reacting together acetylene and hydrocyanic acid in a heated aqueous acid reacting solution of a cuprous halide and zinc chloride as a catalyst in the presence of a solubilizer for the catalyst while maintaining the partial pressure of the acetylene greater than that of the hydrocyanic acid over the catalyst solution.

7. The method of claim 5 wherein the catalyst solution is heated at a temperature within the range of 60 to 119° C.

8. The method of claim 5 in which the solubilizer is chosen from a compound of the class consisting of ammonium, amine and alkali metal salts.

HAROLD S. DAVIS.
HERBERT A. NEWEY.

No references cited.